United States Patent
Borlick et al.

(10) Patent No.: US 9,338,103 B2
(45) Date of Patent: May 10, 2016

(54) INJECTING CONGESTION IN A LINK BETWEEN ADAPTORS IN A NETWORK

(71) Applicant: GLOBALFOUNDRIES U.S 2 LLC, Hopewell Junction, NY (US)

(72) Inventors: Matthew G. Borlick, Tucson, AZ (US); Steven E. Klein, Tucson, AZ (US); Ashwani Kumar, Tucson, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 267 days.

(21) Appl. No.: 14/023,449

(22) Filed: Sep. 10, 2013

(65) Prior Publication Data
US 2015/0071069 A1    Mar. 12, 2015

(51) Int. Cl.
*H04L 12/801*    (2013.01)
*H04L 12/891*    (2013.01)
*H04L 12/26*    (2006.01)

(52) U.S. Cl.
CPC .............. *H04L 47/41* (2013.01); *H04L 47/115* (2013.01); *H04L 47/39* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 4,616,359 A * | 10/1986 | Fontenot | 370/230 |
| 5,193,151 A | 3/1993 | Jain | |
| 6,134,219 A * | 10/2000 | Sato | 370/244 |
| 6,477,143 B1 | 11/2002 | Ginossar | |
| 7,380,019 B2 | 5/2008 | Shiga et al. | |
| 7,975,027 B2 | 7/2011 | Dickens et al. | |
| 8,144,602 B2 * | 3/2012 | Beyers | 370/242 |
| 2003/0115355 A1 | 6/2003 | Cometto et al. | |
| 2003/0185154 A1 | 10/2003 | Mullendore et al. | |
| 2005/0108444 A1 | 5/2005 | Flauaus et al. | |
| 2009/0300209 A1 | 12/2009 | Elzur | |
| 2012/0014253 A1 | 1/2012 | Rongong et al. | |
| 2014/0337674 A1* | 11/2014 | Ivancic et al. | 714/43 |

OTHER PUBLICATIONS

R. Jain, "Delay-Based Approach for Congestion Avoidance in Interconnected Heterogeneous Computer Networks", Digital Equipment Corporation, pp. 16.
U.S. Appl. No. 14/023,456, filed Sep. 10, 2013, titled "Injecting Congestion in a Link Between Adaptors in a Network".
Office Action dated Jun. 9, 2015, pp. 21, for U.S. Appl. No. 14/023,456, filed Sep. 10, 2013.
Response dated Sep. 9, 2015, pp. 12, to Office Action dated Jun. 9, 2015, pp. 21, for U.S. Appl. No. 14/023,456, filed Sep. 10, 2013.

* cited by examiner

*Primary Examiner* — Timothy J Weidner
(74) *Attorney, Agent, or Firm* — Yuanmin Cai; Hoffman Warnick LLC

(57) ABSTRACT

Provided are a computer program product, system, and method for injecting congestion in a link between adaptors in a network. A congestion request is sent to a selected adaptor in a containing network component comprising one of a plurality of network components. The selected adaptor is in communication with a linked adaptor in a linked network component comprising one of the network components. The congestion request causes a delay in servicing the selected adaptor to introduce congestion on a link between the selected adaptor and the linked adaptor.

24 Claims, 6 Drawing Sheets

Port Information

… …

INJECTING CONGESTION IN A LINK BETWEEN ADAPTORS IN A NETWORK

BACKGROUND OF THE INVENTION

1. Field of the Invention

The present invention relates to a computer program product, system, and method for injecting congestion in a link between adaptors in a network.

2. Description of the Related Art

In a Storage Area Network, congestion occurs as a consequence of a slow draining adaptor in the network, which causes delays and congestion in a link between the slow draining adaptor and a linked adaptor. Fibre Channel adaptors are assigned credits indicating a number of frames an adaptor may transmit to a linked port. Upon sending a frame to the linked port, credits are decremented. Upon receiving a reply from the receiving port indicating the frame was processed, credits are incremented. Sending or receiving frames is halted for the duration that the respective buffer credit is zero. During the period of zero buffer credit, the adaptor enters error path handling mode. Proper handling of errors such as time outs, lost frames, alternate path selection, etc. is critical for the successful operation of the adaptor. Debugging and providing fixes once the product is in field is much more expensive than catching these problems during the development cycle. For these reasons, developers may want to force congestion among the links in a network to test how the adaptors and components handle errors.

To introduce congestion in the network during development, hardware devices referred to as jammers may be connected to the network and simulate dropped frames or congested links. Additional components may be provided to overload the target ports and test error handling at the ports.

SUMMARY

Provided are a computer program product, system, and method for injecting congestion in a link between adaptors in a network. A congestion request is sent to a selected adaptor in a containing network component comprising one of a plurality of network components. The selected adaptor is in communication with a linked adaptor in a linked network component comprising one of the network components. The congestion request causes a delay in servicing the selected adaptor to introduce congestion on a link between the selected adaptor and the linked adaptor.

DETAILED DESCRIPTION

Described embodiments provide techniques to inject congestion into a network by causing delays in servicing a selected port for congestion in the network component including the selected port. The delays may cause the adaptor having the selected port to not return buffer credits to a linked port so that the linked port runs out of credits and is then unable to transmit further frames to the selected port, thereby introducing congestion on the link between the selected port and a linked port. During the development phase or to provide customer support, congestion may be introduced to a link in the network to test how the network component, such as a switch or host, including the selected port subject to the congestion injection, handles errors resulting from the congestion.

Figure 1:
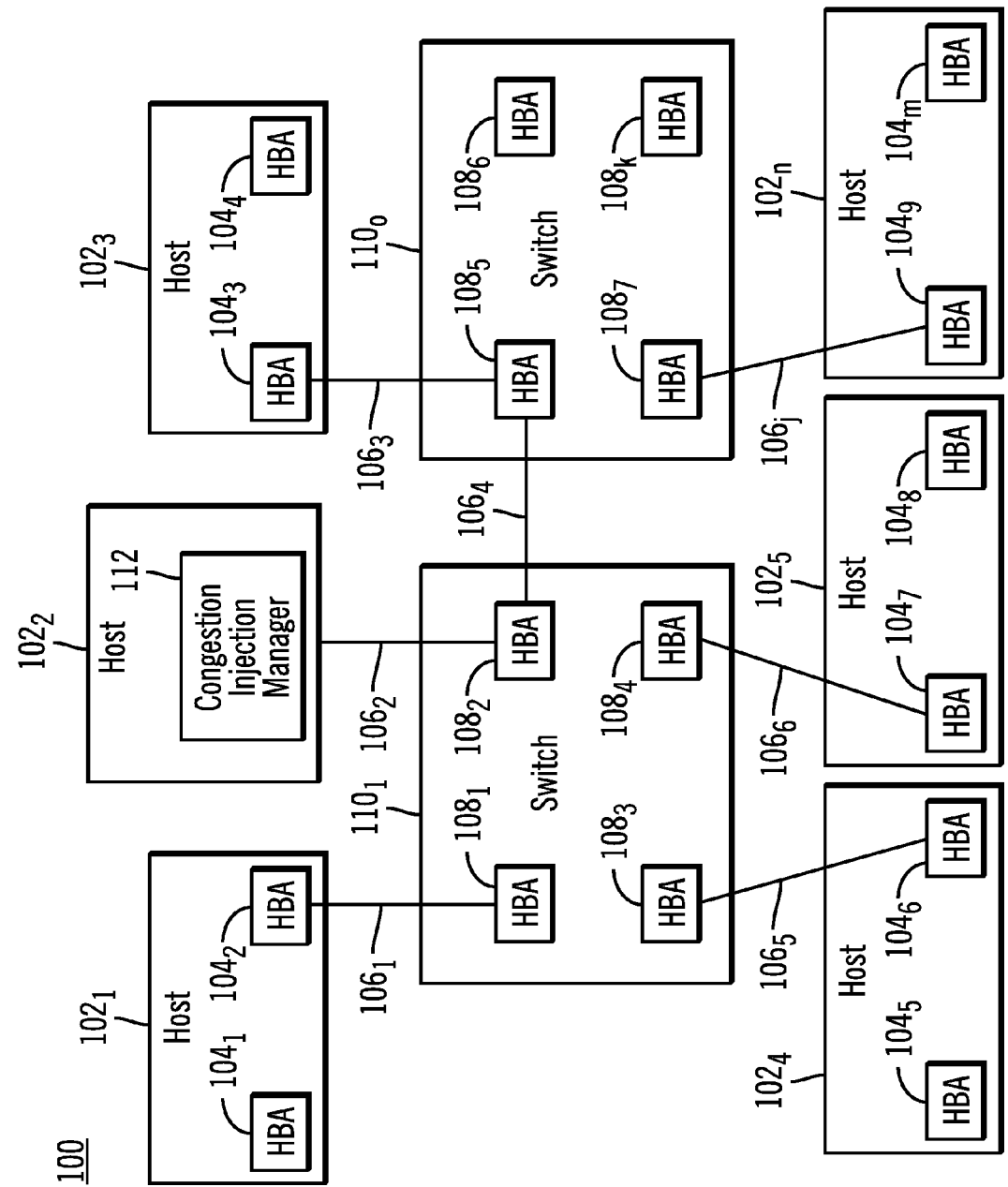
FIG. 1 illustrates an embodiment a network computing environment.

FIG. 1 illustrates a network computing environment 100 having a plurality of hosts $102_1, 102_2 \ldots 102_n$ that each include one or more host bus adaptors HBAs $104_1, 104_2 \ldots 104_m$, where each HBA includes one or more ports (not shown). Network lines or cables $106_1, 106_2 \ldots 106_j$ connect ports on the HBAs $104_1, 104_2 \ldots 104_m$ to ports (not shown) on HBA $108_1, 108_2 \ldots 108_k$ on one of the switches $110_1 \ldots 110_o$. The network 100 implemented by the interconnected hosts $102_1, 102_2 \ldots 102n$ and switches $110_1 \ldots 110_o$ may implement one or more network protocols known in the art, including Fibre Channel, Ethernet, Infiniband, etc.

The use of variable references, such as j, k, m, n, and o denote a variable number of the instances of the elements and may indicate a same number or different number of the elements, such as the hosts, switches, and HBAs. Further, although a certain number of adaptors, hosts, switches, and links are shown, this is by way of example, and various implementations may include any number of hosts, switches and adaptors therein in different implementations of the network 100.

One or more of the hosts, such as host $102_2$ may include a congestion injection manager 112 component to generate congestion requests to the adaptors $104_1, 104_2 \ldots 104_m, 108_1, 108_2 \ldots 108_k$ on the hosts $102_1, 102_2 \ldots 102_n$ and switches $110_1 \ldots 110_o$ to cause congestion and delays in the links $106_1, 106_2 \ldots 106_j$ between a selected port on a selected (host or switch) adaptor to which the congestion request is directed and a linked port on a linked (host or switch) adaptor. The congestion request may cause the network component $102_1, 102_2 \ldots 102_n, 110_1 \ldots 110_o$ to which the congestion request is directed to delay servicing the selected port/adaptor in the request to cause delays on the link $106_1, 106_2 \ldots 106_j$ between the selected port on the selected adaptor $104_1, 104_2 \ldots 104_m, 108_1, 108_2 \ldots 108_k$ and the linked port on the linked host or switch adaptor $108_1, 108_2 \ldots 108_k, 104_1, 104_2 \ldots 104_m, 108_1, 108_2 \ldots 108_k$. Thus, congestion may be introduced on a link between a host and switch or between switches. For instance, the network component $102_1, 102_2 \ldots 102_n, 110_1 \ldots 110_o$ including the selected port may delay allocating buffers for the selected port so that the port may run out of buffers and may not be able to reply ready to the linked port. This may cause the linked port on the linked adaptor $104_1, 104_2 \ldots 104_m, 108_1, 108_2 \ldots 108_k$ to run out of buffer credits, which would preclude the linked adaptor $108_1, 108_2 \ldots 108_k$ from sending or receiving further frames with respect to the connected selected host port, which causes congestion on the link $106_1, 106_2 \ldots 106_j$.

An adaptor developer may want to use the congestion injection manager 112 to inject congestion on links $106_1, 106_2 \ldots 106_j$ in the network 100 to determine whether the host, switch and adaptor code is capable of adequately handling errors caused by the introduced congestion. This congestion injection manager 112 may be used during development of the host, switch and adaptor code and is implemented by introducing firmware into the host $102_1, 102_2 \ldots 102_n$, switches $110_1 \ldots 110_o$ and adaptors $104_1, 104_2 \ldots 104_m$, $108_1, 108_2 \ldots 108_k$ to test how the components and firmware handles errors resulting from congestion on the links between adaptor ports in the network.

Figure 2:
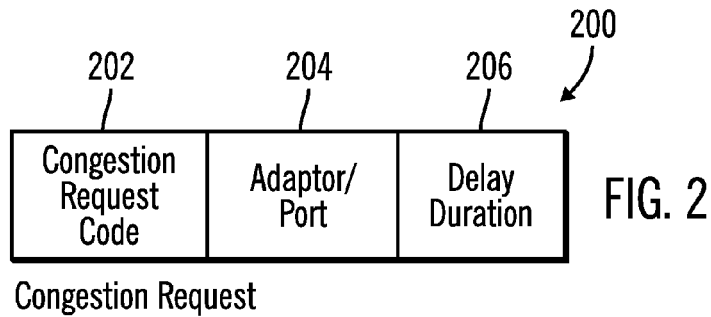
FIG. 2 illustrates an embodiment of a congestion request.

FIG. 2 illustrates an embodiment of a congestion request 200 generated by the congestion injection manager 112 including a congestion request code 202 identifying the request as a congestion request; a user or machine selected adaptor/port 204 to which the congestion request is directed; and a delay duration 206 during which the servicing of the selected adaptor/port 204 is delayed to cause congestion on the link $106_1, 106_2 \ldots 106_j$ between the selected adaptor/port 204 and the port to which the selected adaptor/port 204 links. In one embodiment, the request may be directed to a single port on a selected adaptor $104_1, 104_2 \ldots 104_m, 108_1, 108_2 \ldots 108_k$. Alternatively, the request may be directed to an adaptor $104_1, 104_2 \ldots 104_m, 108_1, 108_2 \ldots 108_k$ to cause delays in servicing for all ports on the selected adaptor 204 to cause congestion on the links $106_1, 106_2 \ldots 106_j$ between all ports on the selected adaptor 204 and the linked ports on one or more linked adaptors $104_1, 104_2 \ldots 104_m, 108_1, 108_2 \ldots 108_k$ in the network 100. The identified port 204 may comprise a worldwide name or other unique identifier of the port.

Figure 3:
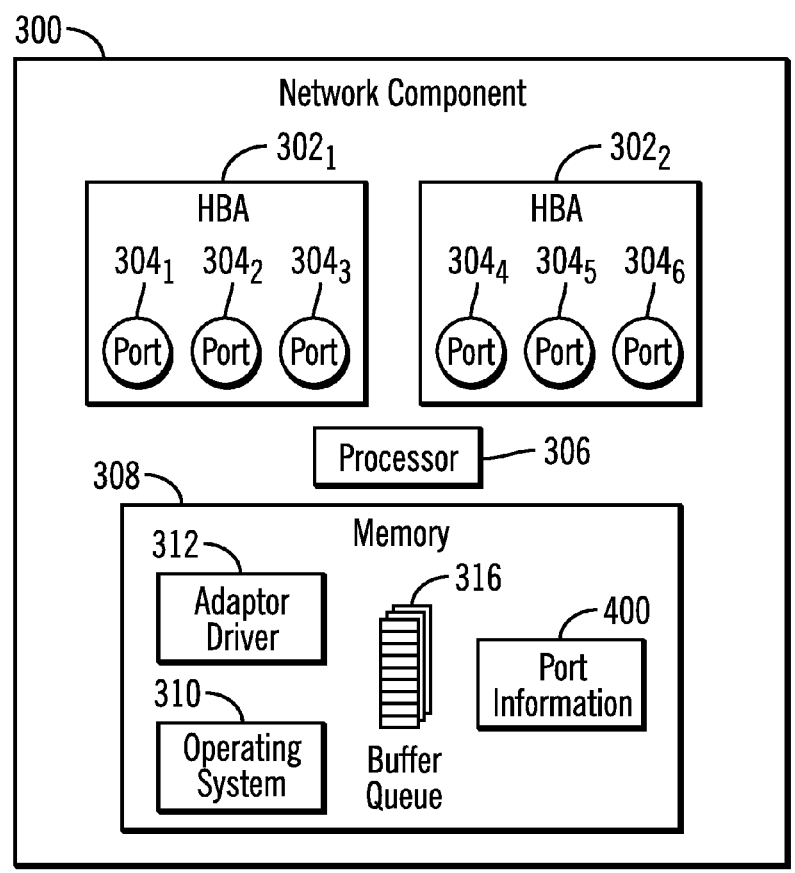
FIG. 3 illustrates an embodiment of a network component.

FIG. 3 illustrates an embodiment of a network component 300, such as one of the hosts $102_1, 102_2 \ldots 102_n$ and switches $110_1 \ldots 110_o$, including one or more HBAs $302_1, 302_2$, each including one or more ports $304_1, 304_2 \ldots 304_6$; a processor 306, comprising one or central processing units (CPUs) having one or more processing cores; and a memory 308 including program components processed by the processor 306. The memory 308 includes a network component operating system 310; an adaptor driver 312 to interface between the HBAs $302_1, 302_2$ and the operating system 306; port information 400 having information on the available ports $304_1 \ldots 304_6$; and buffer queues 316 to provide buffers allocated in the memory 308 for use with the ports $304_1 \ldots 304_6$ to buffer frames received from the linked port/adaptor in another network component. There may be one buffer queue 316 for each port $304_1 \ldots 304_6$. Further, although a certain number of HBAs and ports are shown, various implementations may include any number of HBAs and ports in the network component 300. In Fibre Channel implementations, when the adaptor $302_1, 302_2$ stores a received frame to a buffer from the buffer queue 316, the adaptor $302_1, 302_2$ may return a receiver-ready (R_Ready) to the transmitting adaptor to cause the transmitting adaptor to increment available credits for the linked port on the transmitting side to allow the transmitting port to be used to transmit further frames to the port $304_1, 304_2 \ldots 304_6$ on which the R-Ready is returned.

In the embodiment of FIG. 3, the adaptor driver 312 is shown as code implemented in a computer readable storage medium executed by the processor 306. Alternatively, the adaptor driver 312 may be implemented with hardware logic, such as an Application Specific Integrated Circuit (ASIC).

Figure 4:
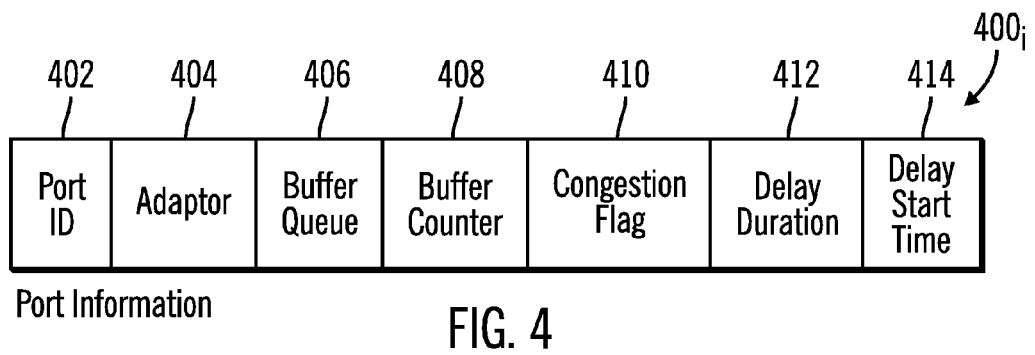
FIG. 4 illustrates an embodiment of port information.

FIG. 4 illustrates an embodiment of an instance 400, of the port information for one of the ports, e.g., ports $304_1, 304_2 \ldots 304_6$. The port information 400, for one port includes a port identifier (ID) 402; an adaptor 404 having the port 402; a buffer queue 406 pointing to the buffer queue for the port 402 in the memory 308; a buffer counter 408 indicating a number of available buffers in the buffer queue 406 for the port 402, where the buffer counter 408 is incremented when the adaptor driver 312 allocates a buffer in the memory 308 for the buffer queue 406 and is decremented when the adaptor 404 uses one of the buffers in the buffer queue 406 for a frame transmitted on the port 402; a congestion flag 410 indicating whether the driver 312 should delay servicing the port 402, e.g., adding buffers to the buffer queue 316; a delay duration indicating a time during which the servicing of the port 402 is delayed; and a delay start time 414 indicating a start of the current delay time used to determine whether the delay of the servicing has occurred for the duration 412 extending from the start time 414.

Figure 5:
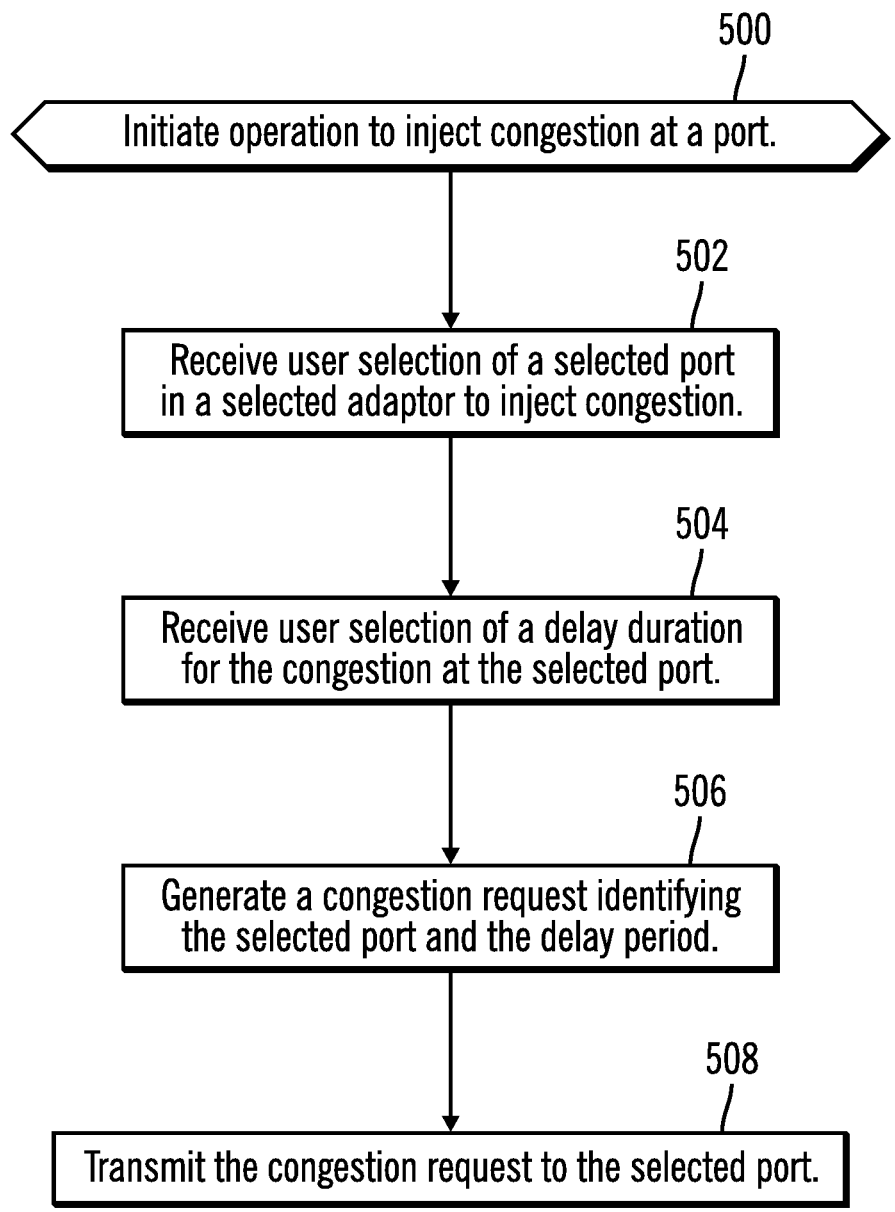
FIG. 5 illustrates an embodiment of operations to inject congestion at a port.

FIG. 5 illustrates an embodiment of operations performed by the congestion injection manager 112 to generate a congestion request 200. Upon initiating (at block 500) the operation to inject congestion in a port on an HBA $104_1, 104_2 \ldots 104_m, 108_1, 108_2 \ldots 108_k$, the congestion injection manager 112 receives (at block 502) user or machine selection of a selected port in a selected adaptor to inject congestion. The connection injection manager 112 may render a graphical user interface (GUI) providing a graphical display showing links and connections in the network 100 to enable the user to select a port of a link on which to inject congestion. The connection injection manager 112 also receives (at block 504) user or machine selection of a delay duration for delaying servicing the selected port to introduce congestion. A congestion request 200 is generated including a congestion request code 202, the selected adaptor or port 204, and the delay duration 206 entered by the user. The congestion request 200 is then transmitted (at block 508) to the selected port 204 to process.

Figure 6:
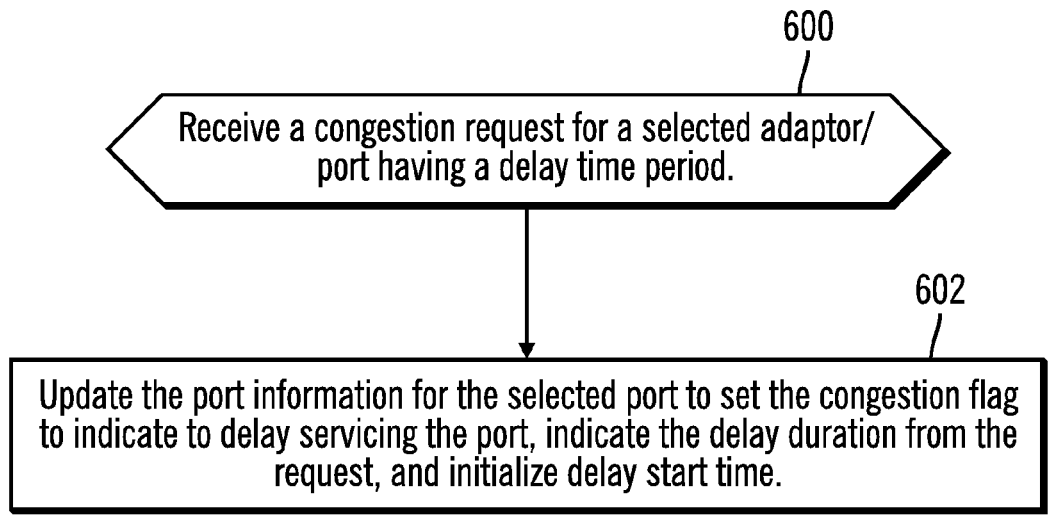
FIG. 6 illustrates an embodiment to process a congestion request.

FIG. 6 illustrates an embodiment of operations performed by the adaptor driver 312 to process a congestion request 200 received on the selected port $304_1, 304_2 \ldots 304_6$. Upon receiving the request, the adaptor $302_1, 302_2$ having the selected port $304_1, 304_2 \ldots 304_6$. may forward the request to the adaptor driver 312 to process. Upon the driver 312 receiving (at block 600) the request 200, the adaptor driver 312 updates (at block 602) the port information 400, for the selected port to set the congestion flag 410 to indicate to delay servicing the identified port 204, indicate the delay duration 206 from the request 200 in the delay duration field 412, and initialize the delay start time 414 to a current time or initial value.

Figure 7:
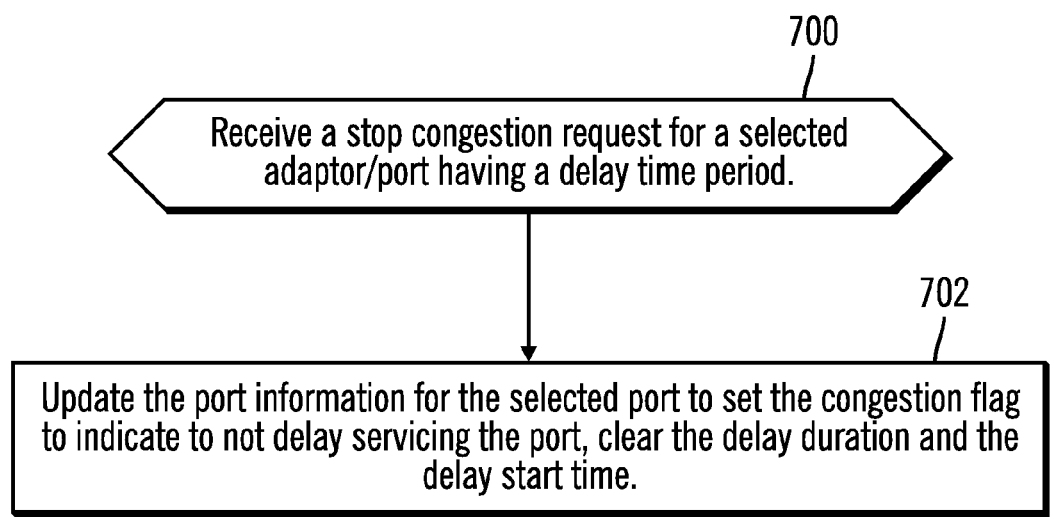
FIG. 7 illustrates an embodiment to process a stop congestion request.

FIG. 7 illustrates an embodiment of operations performed by the adaptor driver 312 to process a congestion stop request received on the selected port $304_1, 304_2 \ldots 304_6$. Upon receiving the request, the adaptor $302_1, 302_2$ having the selected port $304_1, 304_2 \ldots 304_6$ may forward the stop congestion request to the adaptor driver 312 to process. Upon the driver 312 receiving (at block 700) the stop congestion request, the adaptor driver 312 updates (at block 702) the port information 400, for the selected port to set the congestion flag 410 to indicate to not delay servicing the identified port 204 and clear the delay duration 412 and the delay start time 414.

Figure 8:
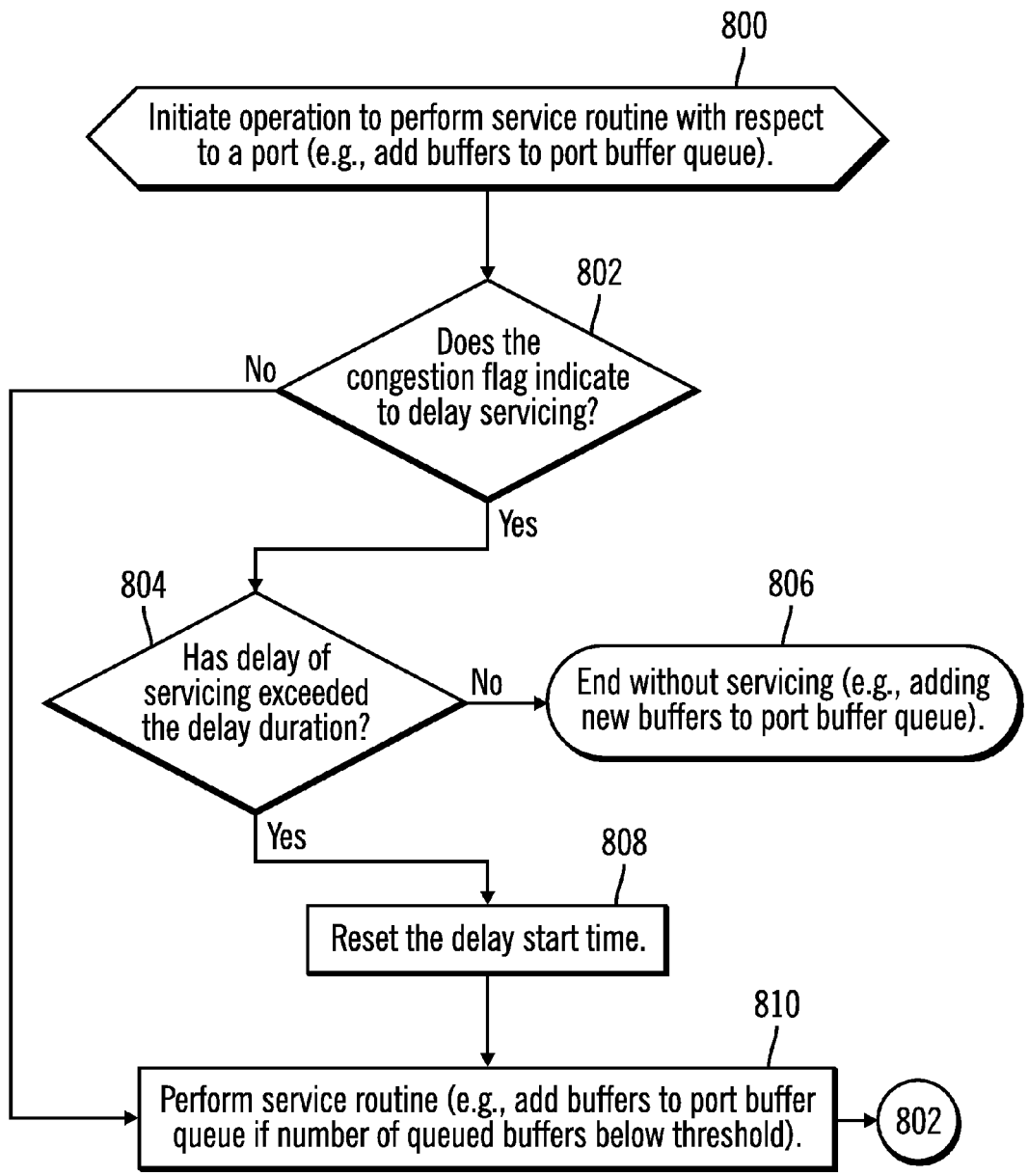
FIG. 8 illustrates an embodiment of operations to perform servicing of a port.

FIG. 8 illustrates an embodiment of operations performed by the adaptor driver 312 to perform a service routine with respect to a port. In certain embodiments, the service routine may comprise operations to allocate additional buffers to the buffer queue 316 for the port so that the port $304_1, 304_2 \ldots 304_6$ will not run out of buffers, which would result in the HBA $302_1, 302_2$ having the port $304_1, 304_2 \ldots 304_6$ not returning ready to the transmitting adaptor to cause the transmitting port to run out of buffer credits and not be able to transmit any further frames to the port $304_1, 304_2 \ldots 304_6$, resulting in congestion. In alternative embodiments, the service routine to which the delay is introduced may affect other adaptor driver 312 operations for the ports whose delay would introduce congestion on the link $106_1, 106_2 \ldots 106_j$ between the port $304_1, 304_2 \ldots 304_6$ subject to the processing of FIG. 8 and a linked port.

Upon initiating (at block 800) the port servicing, e.g., allocating new buffers to the buffer queue 316 for the port, if (at block 802) the congestion flag 310 indicates to delay the servicing, then the adaptor driver 312 determines (at block 804) whether the delay of servicing time has exceeded the delay duration 412. The delay of servicing time may comprise a difference of a current time and the delay start time 414. If (from the no branch of block 804) the delay of the servicing has exceeded the delay duration 412, then the adaptor driver 312 ends (at block 806) the routine without performing the servicing operation, e.g., allocating new buffers to the port buffer queue 316).

If (at block 804) the delay of servicing has extended for more than the delay duration 208, then the delay start time 414 is reset (at block 808) and the adaptor driver 312 performs (at block 810) the service routine (e.g., allocates buffers to the port buffer queue 316 if the number of queued buffers, as indicated in the buffer counter 408, is below a threshold setting. Control then proceeds from block 810 back to block 802 to continue to delay servicing if the congestion flag 310 remains set. In this way, some relief to the injected congestion is provided after the delay duration, except that following the servicing after the delay duration, another iteration of the delay of servicing continues for the delay duration. These iterations of delaying of servicing for the delay duration continues until the congestion stop request is received that resets the congestion flag 410 to stop the delays in servicing.

In the described embodiments, congestion is injected by causing the adaptor driver 312 to delay servicing the selected port, such as by not allocating further buffers to cause the adaptor $302_1$, $302_2$ to stop returning ready to the linked port so that the linked port runs out of buffer credits and is prevented from transmitting frames to the selected port $304_1$, $304_2$ ... $304_6$. In alternative embodiments, the delay in servicing may involve operations other than preventing the selected adaptor from allocating credits which results in congestion being introduced. Further, in alternative embodiments, the congestion related operations may be performed by a component other than the adaptor driver 312. For instance, code in the adaptor itself $302_1$, $302_2$ may delay certain operations to cause the linked adaptor or port to run out of credits thereby introducing congestion into the link and network 100.

With the described embodiments, congestion on a link may be introduced by communicating a congestion request to a selected port to cause the adaptor driver 312 or other component to delay servicing the selected port so that congestion is introduced on a link $106_1$, $106_2$ ... $106_j$ between the selected port and a linked port. This allows a developer of the host firmware to introduce congestion into a link to test how the adaptor and host firmware handles errors resulting from the congestion. Described embodiments allow the introduction of targeted congestion on specific ports for specified durations by providing modifications to the adaptor and host firmware, without requiring that specialized hardware devices be introduced into the network 100 to simulate congestion conditions. Further, following development, the host and adaptor firmware released to customers may or may not include the congestion handling code.

In yet further implementations, the host, switch and adaptor firmware released to customers may include the congestion related code to allow the vendor to troubleshoot and service host, switches, and adaptors at customer sites by introducing congestion to determine whether congestion handling problems are resulting in customer complaints.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
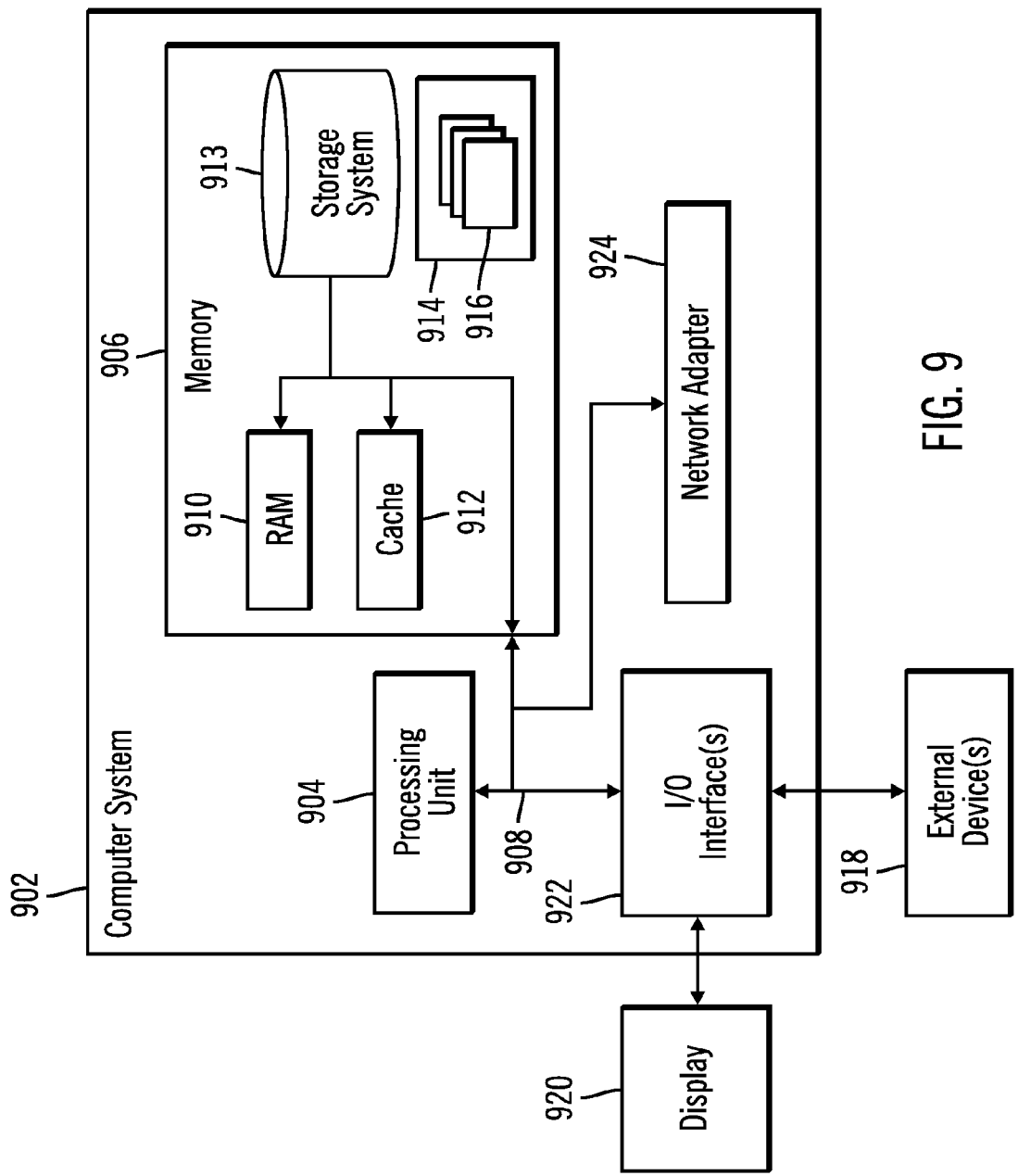
FIG. 9 illustrates an embodiment of a computer system in which embodiments may be implemented.

FIG. 9 illustrates an embodiment of a computer system 902 which may comprise an implementation of the network components 300, $102_1$, $102_2$ ... $102_n$, and $110_1$ ... $110_o$. Computer node 902 is only one example of a suitable computing node and is not intended to suggest any limitation as to the scope of use or functionality of embodiments of the invention described herein. Regardless, computer node 902 is capable of being implemented and/or performing any of the functionality set forth hereinabove.

The computer node 902 is operational with numerous other general purpose or special purpose computing system environments or configurations. Examples of well-known computing systems, environments, and/or configurations that may be suitable for use with computer node 902 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 902 may be described in the general context of computer system executable instructions, such as program modules, being executed by a computer system. Generally, program modules may include routines, programs, objects, components, logic, data structures, and so on that perform particular tasks or implement particular abstract data types. Computer node 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 902 is shown in the form of a general-purpose computing device. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 902 typically includes a variety of computer system readable media. Such media may be any available media that is accessible by computer node 902, and it includes both volatile and non-volatile media, removable and non-removable media, and may be used for storing the programs and data used by the programs.

System memory 906 can include computer system readable media in the form of volatile memory, such as random access memory (RAM) 910 and/or cache memory 912. Computer node 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules (e.g., job migrator 132, listener 124, etc., and program data. Each of the operating system, one or more application programs, other program modules, and program data or some combination thereof, may include an implementation of a networking environment. Program modules 916 generally carry out the functions and/or methodologies of embodiments of the invention as described herein, such as the operations of the logging program 8.

Computer node 902 may also communicate with one or more external devices 918 such as a keyboard, a pointing device, a display 920, etc.; one or more devices that enable a user to interact with the computer node 902; and/or any devices (e.g., network card, modem, etc.) that enable computer system/server 902 to communicate with one or more other computing devices. Such communication can occur via Input/Output (I/O) interfaces 922. Still yet, computer node 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for testing a network comprised of network components including hosts and at least one switch, wherein the network components include adaptors to enable network communication among the network components, the computer program product including a non-transitory computer readable medium having computer readable program code embodied therein that executes to perform operations, the operations comprising:
    sending a congestion request to a selected adaptor in a containing network component comprising one of the network components,
    wherein the selected adaptor is in communication with a linked adaptor in a linked network component comprising one of the network components,
    wherein the congestion request specifies a delay duration;
    setting a congestion flag to indicate to delay servicing the selected adaptor, indicate the delay duration, and initialize a delay start time;
    if the congestion flag indicates to delay servicing, causing a delay in servicing the selected adaptor to introduce congestion on a link between the selected adaptor and the linked adaptor to test how at least one of the network components handles errors resulting from the congestion, and determining whether the delay of servicing has exceeded the delay duration;
    if the delay of servicing has exceeded the delay duration, ending the delay of servicing without allocating new buffers to the selected adaptor; and
    if the delay of servicing has not exceeded the delay duration, resetting the delay start time, and allocating new buffers to the selected adaptor.

2. The computer program product of claim 1, wherein the congestion request identifies a selected port in the selected adaptor, wherein the congestion request causes the delay in servicing for the selected port.

3. The computer program product of claim 1, wherein the congestion request does not cause delay in servicing other ports in the selected adaptor or another adaptor in the containing network component.

4. The computer program product of claim 1, wherein the delay in servicing the selected adaptor occurs for at least the delay duration and wherein normal servicing of the selected adaptor occurs following the delay of servicing for the delay duration.

5. The computer program product of claim 1, wherein the congestion request causes the selected adaptor to stop returning buffer credits to the linked adaptor which causes the linked adaptor to run out of credits for the selected adaptor and stop sending frames to the selected adaptor, thereby resulting in network congestion.

6. The computer program product of claim 1, wherein the operations further comprise:
    receiving user selection of a port on one of the adaptors, wherein the servicing delay is with respect to the user selected port.

7. The computer program product of claim 1, wherein the operations further comprise:
    sending a stop congestion request to the selected adaptor, wherein the stop congestion request causes the containing network component to stop delaying servicing the selected adaptor and continue with normal servicing of the selected adaptor.

8. The computer program product of claim 1, wherein the containing network component and the linked network component comprise one of:
the containing network component comprising a host and the linked network component comprising a switch;
the containing network component comprising a first switch and the linked network component comprising a second switch linked to the first switch.

9. A system for testing a network comprised of network components including hosts and at least one switch, wherein the network components include adaptors to enable network communication among the network components, comprising:
a processor; and
a computer readable storage medium having code executed by the processor to perform operations including:
sending a congestion request to a selected adaptor in a containing network component comprising one of the network components,
wherein the selected adaptor is in communication with a linked adaptor in a linked network component comprising one of the network components,
wherein the congestion request specifies a delay duration;
setting a congestion flag to indicate to delay servicing the selected adaptor, indicate the delay duration, and initialize a delay start time;
if the congestion flag indicates to delay servicing, causing a delay in servicing the selected adaptor to introduce congestion on a link between the selected adaptor and the linked adaptor to test how at least one of the network components handles errors resulting from the congestion, and determining whether the delay if servicing has exceeded the delay duration;
if the delay of servicing has exceeded the delay duration, ending the delay of servicing without allocating new buffers to the selected adaptor; and
if the delay of servicing has not exceeded the delay durations, resetting the delay start time, and allocating new buffers to the selected adaptor.

10. The system of claim 9, wherein the congestion request identifies a selected port in the selected adaptor, wherein the congestion request causes the delay in servicing for the selected port.

11. The system of claim 9, wherein the congestion request does not cause delay in servicing other ports in the selected adaptor or another adaptor in the containing network component.

12. The system of claim 9, wherein the delay in servicing the selected adaptor occurs for at least the delay duration and wherein normal servicing of the selected adaptor occurs following the delay of servicing for the delay duration.

13. The system of claim 9, wherein the congestion request causes the selected adaptor to stop returning buffer credits to the linked adaptor which causes the linked adaptor to run out of credits for the selected adaptor and stop sending frames to the selected adaptor, thereby resulting in network congestion.

14. The system of claim 9, wherein the operations further comprise:
receiving user selection of a port on one of the adaptors, wherein the servicing delay is with respect to the user selected port.

15. The system of claim 9, wherein the operations further comprise:
sending a stop congestion request to the selected adaptor, wherein the stop congestion request causes the containing network component to stop delaying servicing the selected adaptor and continue with normal servicing of the selected adaptor.

16. The system of claim 9, wherein the containing network component and the linked network component comprise one of:
the containing network component comprising a host and the linked network component comprising a switch;
the containing network component comprising a first switch and the linked network component comprising a second switch linked to the first switch.

17. A method for testing a network comprised of network components including hosts and at least one switch, wherein the network components include adaptors to enable network communication among the network components, comprising:
sending a congestion request to a selected adaptor in a containing network component comprising one of the network components,
wherein the selected adaptor is in communication with a linked adaptor in a linked network component comprising one of the network components,
wherein the congestion request specifies a delay duration;
setting a congestion flag to indicate to delay servicing the selected adaptor, indicate the delay duration, and initialize a delay start time;
if the congestion flag indicates to delay servicing, causing a delay in servicing the selected adaptor to introduce congestion on a link between the selected adaptor and the linked adaptor to test how at least one of the network components handles errors resulting from the congestion, and determining whether the delay of servicing has exceeded the delay duration;
if the delay of servicing has exceeded the delay duration, ending the delay of servicing without allocating new buffers to the selected adaptor; and
if the delay of servicing has not exceeded the delay duration, resetting the delay start time, and allocating new buffers to the selected adaptor.

18. The method of claim 17, wherein the congestion request identifies a selected port in the selected adaptor, wherein the congestion request causes the delay in servicing for the selected port.

19. The method of claim 17, wherein the congestion request does not cause delay in servicing other ports in the selected adaptor or another adaptor in the containing network component.

20. The method of claim 17, wherein the delay in servicing the selected adaptor occurs for at least the delay duration and wherein normal servicing of the selected adaptor occurs following the delay of servicing for the delay duration.

21. The method of claim 17, wherein the congestion request causes the selected adaptor to stop returning buffer credits to the linked adaptor which causes the linked adaptor to run out of credits for the selected adaptor and stop sending frames to the selected adaptor, thereby resulting in network congestion.

22. The method of claim 17, further comprising:
receiving user selection of a port on one of the adaptors, wherein the servicing delay is with respect to the user selected port.

23. The method of claim 17, further comprising:
sending a stop congestion request to the selected adaptor, wherein the stop congestion request causes the containing network component to stop delaying servicing the selected adaptor and continue with normal servicing of the selected adaptor.

24. The method of claim 17, wherein the containing network component and the linked network component comprise one of:
  the containing network component comprising a host and the linked network component comprising a switch, or
  the containing network component comprising a first switch and the linked network component comprising a second switch linked to the first switch.

* * * * *